United States Patent
Erlichman

[15] 3,640,724
[45] Feb. 8, 1972

[54] CAMERA FRAME MEMBER
[72] Inventor: Irving Erlichman, Wayland, Mass.
[73] Assignee: Polaroid Corporation, Cambridge, Mass.
[22] Filed: May 13, 1969
[21] Appl. No.: 824,097

[52] U.S. Cl. ..............................................95/11 R, 95/39
[51] Int. Cl. ..........................................................G03b 17/04
[58] Field of Search..........................................95/11, 13, 39

[56] References Cited

UNITED STATES PATENTS 3,447,437   6/1969   Tiffany.........................................95/13

Primary Examiner—John M. Horan
Assistant Examiner—Alan Mathews
Attorney—Brown and Mikulka, Robert E. Cord and Alfred E. Corrigan

[57] ABSTRACT

A compact folding camera including a plurality of housing sections, including at least a portion of one which provides for access to the interior of the housing, coupled together for movement between an extended, operative position and a folded, inoperative position. A support member, enclosed by the housing sections, is provided for locating a photosensitive element in position for exposure and for pivotally supporting a plurality of housing sections, a bellows, and an erecting system during movement of the housing sections, erecting system and bellows between the extended and folded position.

10 Claims, 4 Drawing Figures

PATENTED FEB 8 1972

3,640,724

INVENTOR.
IRVING ERLICHMAN

BY Brown and Mikulka
and
Alfred E. Corrigan
ATTORNEYS

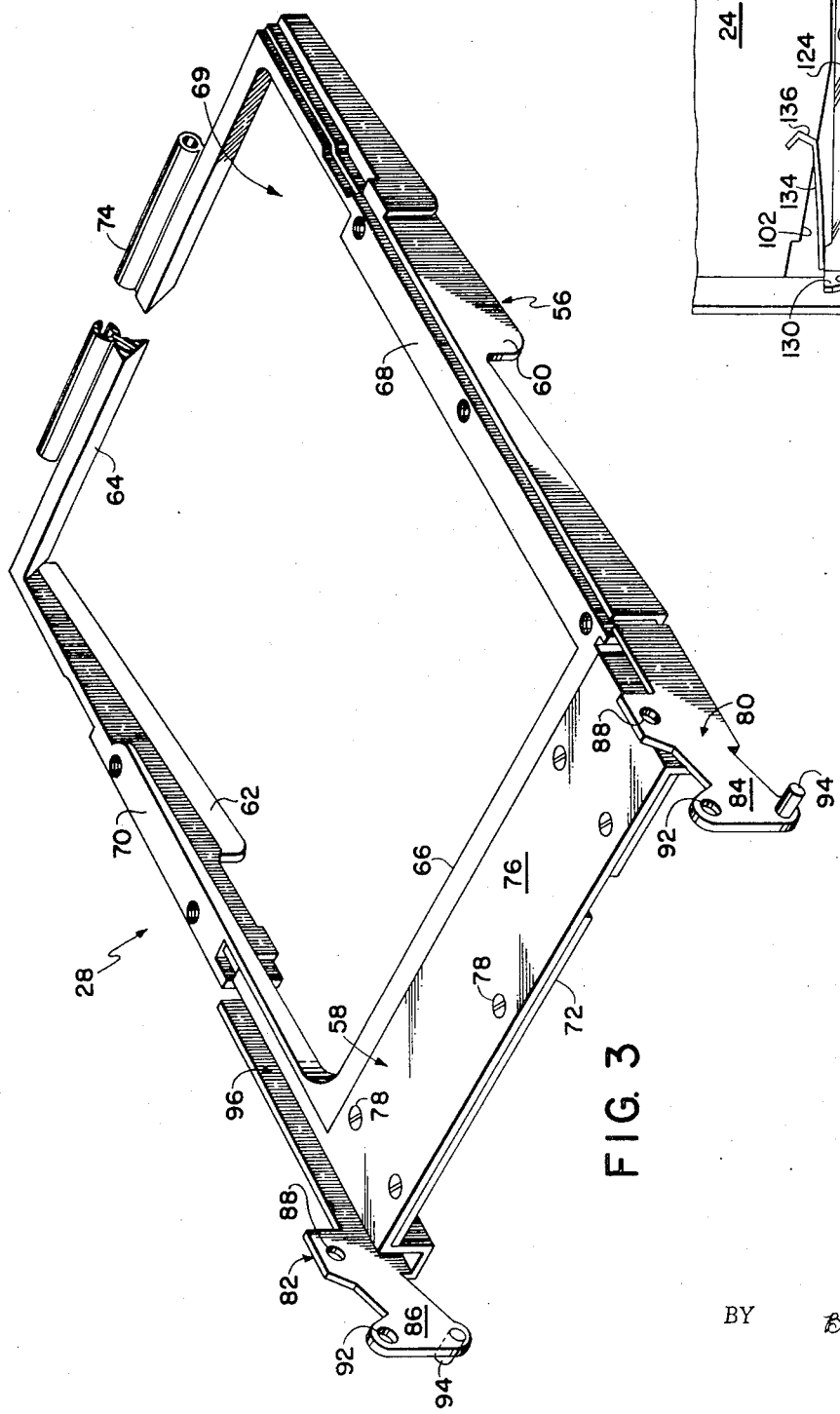
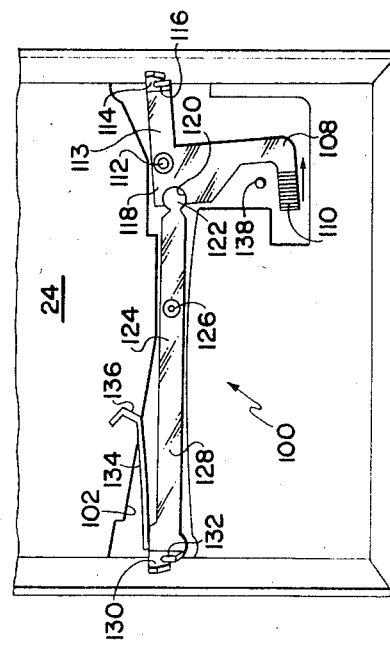

CAMERA FRAME MEMBER

The present invention is concerned with a folding camera of the self-developing type which is adapted for use with a film pack including a plurality of photosensitive elements or film units each comprising all of the materials required to produce a photographic print when the film unit is processed subsequent to exposure. A camera of this type includes a housing comprising a plurality of sections coupled to each other for movement between an extended, operative position and a folded, inoperative position and an erecting system for moving the sections between said extended and folded positions. Components of the camera's exposure system, e.g., the lens and reflector, are mounted on various housing sections and must be in proper alignment when in the extended position to direct light toward a photosensitive element supported in position for exposure within said housing. Alignment of the optical path of a folding camera is simplified by mounting the housing sections carrying the various components of the exposure system on the same member which supports the photosensitive element in position for exposure and coupling the sections together for simultaneous movement.

An object of the invention is to provide in a camera of the foregoing type including a housing having a plurality of sections coupled together for movement between extended and folded positions, and an erecting system for moving said sections between said positions and for maintaining said sections in said extended position, means for supporting said sections during movement between said positions and for supporting a photosensitive element in position for exposure.

Another object of the invention is to provide in a camera of the foregoing type including a plurality of sections, each of which carries a component of the camera's exposure system, coupled together for movement between extended and folded positions and erecting means for moving said sections between said positions, means for supporting said sections during said movement and for locating a photosensitive element in position for exposure.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 3 is a perspective view, partly broken away, of one of the components of the camera; and FIG. 4 is a fragmentary plan view of a locking arrangement utilized in the camera.

Figures 1, 2:
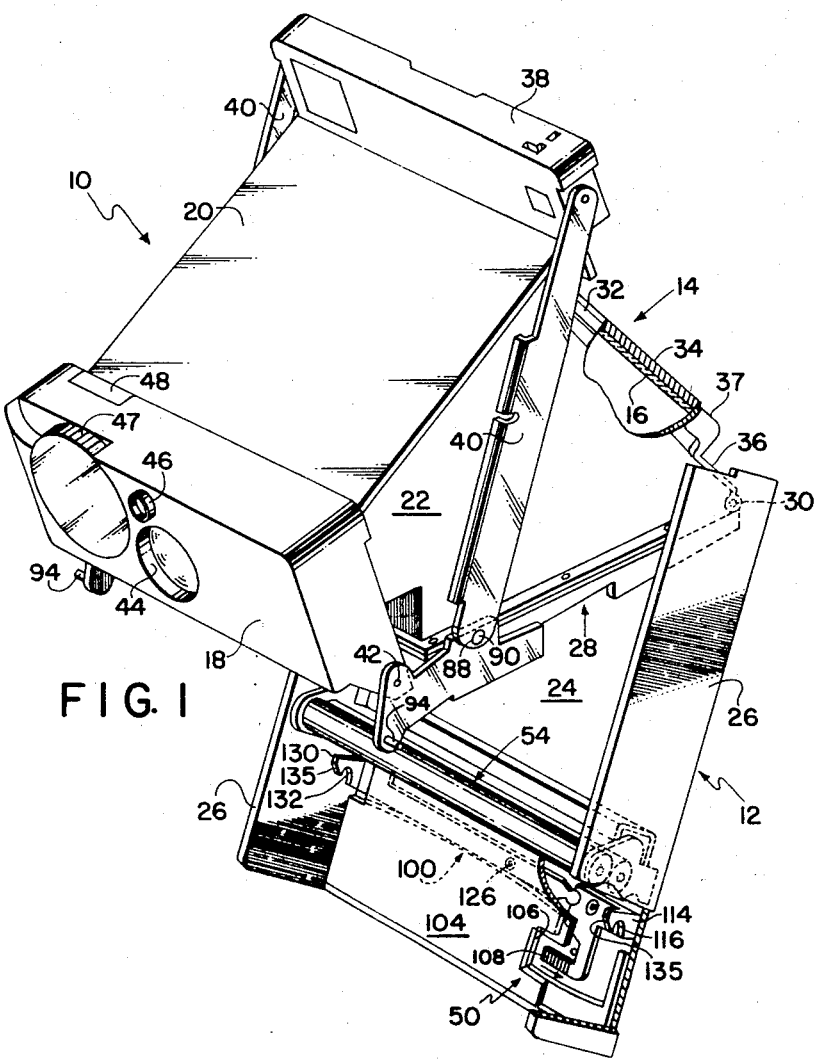
FIG. 1 is a perspective view of a camera embodying the invention shown in its extended or operative position with the loading door shown in the open position.
FIG. 2 is a perspective view, partly in section, of the camera shown in its folded position.

Reference is now made to FIGS. 1–4 of the drawings wherein is shown a preferred embodiment of the invention, more specifically, a folding camera of the self-developing type generally indicated by reference numeral 10. Camera 10 comprises a housing including a section 12; a section 14 having a reflector, e.g., a mirror 16, mounted thereon for directing light from the camera's lens toward a photosensitive element positioned for exposure adjacent section 12; a section 18 incorporating a lens and shutter assembly; a section 20 coupled near its ends to sections 14 and 18, respectively, said section 20 functioning as a section of a protective cover for the camera in the folded position; and a flexible bellows 22.

Housing section 12 includes a rear wall 24, sidewalls 26 and a support member 28 for supporting and locating a photosensitive element in position for exposure. Wall 24, which functions as a loading door or closure means, is coupled near one end thereof to support member 28 and section 14 via pivot means 30 extending through sidewalls 26 to enable movement of wall 24 to a position in which a pack of film units or film container may be inserted into position in engagement with support member 28 as will be more clearly explained hereinafter.

Housing section 14 is provided with a slot 32 running along each side thereof and an outer wall including a planar portion having an outer surface disposed substantially in the same plane as the forward edges of sidewalls 26 when the camera is folded, so as to define section of the forward wall of the folded camera and recessed sections 36 and 37 located near the end at which section 14 is pivotally connected to section 12 and cooperating with sidewalls 26 to provide, in the folded position of the camera, external recesses for receiving a rangefinder-viewfinder 38 pivotally mounted near the ends of a pair of erecting links 40.

Housing section 18 has a thickness dimension (measured along the optic axis) slightly less than the thickness of section 12 and is pivotally mounted at 42 to each side of support member 28. Section 18 is mounted between sidewalls 26 for pivotal movement between a folded position as shown in Fig. 2 in which it is engaged between sidewalls 26 and covers a release means 50 (the function of which will be explained shortly) and an erect, operative position as shown in FIG. 1 in which section 18 is pivoted from the folded position through an angle of less than 90°, e.g., approximately 70°-75°, with respect to section 12. Section 18 includes an exposure system including an adjustable focus objective lens and shutter 44; a window 46 for admitting light to a photocell for controlling operation of the shutter; a focusing control 47; and a shutter release button 48 provided in that wall of housing section 18 which is uppermost in the erect position and constitutes an end wall of the camera in the folded position.

The camera is preferably of the self-developing type and is adapted for use with film units of the type shown and described in detail in the copending U.S. applications of Edwin H. Land, Ser. No. 622,287 and Edwin H. Land et al., Ser. No. 622,286, both filed Mar. 10, 1967, the latter application now abandoned and generally referred to herein by reference numeral 52. Film units of this type each incorporates all of the materials necessary to produce a positive photographic print including a photosensitive element, a second or image-receiving element which is transparent and is secured in face-to-face relation with the photosensitive element, and a rupturable pod of processing liquid secured to one end of the photosensitive and second elements for dispensing its liquid contents therebetween in response to the application of compressive pressure to the pod. Each film unit is adapted to be processed by advancing the film unit 52, pod foremost, between a pair of pressure-applying members, e.g., a pair of rolls 54 mounted on section 12, which dispense the liquid contents of the pod therefrom between the photosensitive and second elements and spread the liquid between and in contact with the two elements toward the trailing edge thereof.

The various housing sections enclose a support member 28 which supports and locates a photosensitive element in position for exposure. Support member 28 (see FIG. 3) includes a generally rectangular portion 56 which may be formed from any suitable material such as plastic and a generally U-shaped member 58 formed from steel, for example. Rectangular portion 56 includes sidewalls 60 and 62 and end walls 64 and 66 which define an exposure opening 69. Each sidewall 60, 62 is provided with a reentrant flange 68, 70, respectively, the underside of which engages the forward wall of the film container 53 as it is moved upwardly (as viewed in FIG. 3) into engagement with the support member 28 to properly locate the forwardmost film unit in the container in position for exposure. The film container 53 is thus properly oriented with regard to the focal plane of the camera by the side and end walls and flanges 68 and 70. Means such as springs mounted on the interior surface of door 24 may be provided for urging the film container 53 toward support member 28. The forward surfaces (top surfaces as seen in FIG. 3) of flanges 68 and 70 also function as a mounting surface for bellows 22. Extending from wall 66 is a flange 72 which provides a means of attachment for U-shaped member 58. End wall 64 is provided with a knuckle 74 which cooperates with knuckles (not shown) on sections 12 and 14 for pivotally connecting support member 28 to sections 12 and 14.

U-shaped member 58 includes a base portion 76 which is attached to flange 72 by suitable means, e.g., screws 78, and U-shaped legs 80 and 82. The outer flange 84, 86, respectively, of each leg is provided with an opening 88 for receiving pins 90 (see FIG. 1) located near the lower end of each erecting link 40; an opening 92 for receiving pins 42 for pivotally connecting housing section 18 to support member 28; and shafts 94 which are part of a locking arrangement for releasably locking section 12 to support member 28. U-shaped leg 82 includes a channel 96 running along one side of rectangular member 56 for guiding and supporting a portion of a reciprocating means mounted in the camera which functions to remove a film unit 52 from the film container 53 subsequent to exposure. For a more detailed description of a means for removing a film unit from a container, reference is made to the copending application of Erlichman et al., Ser. No. 764,142, filed Aug. 16, 1968, now U.S. Pat. No. 3,545,357.

From the foregoing it can be seen that support member 28 functions as a chassis upon which various components of the camera are mounted, e.g., sections 14 and 18 which carry components of the camera's exposure system, i.e., the reflector 16 and lens 44, respectively, erecting links 40 and bellows 22. Besides providing a location for centralizing the forces on the camera as it is moved between its folded and extended positions, support member 28 also locates and supports the film unit 52 in position for exposure.

Folding cameras of the type described are usually loaded with a film container or pack containing a plurality of film units while the camera is in the folded position. As can be seen from cursory view of FIG. 2, a portion of the film container 53 could protrude through the exposure opening 69 in support member 28 and contact and possibly scratch or crack the reflector 16 while the camera is in the folded position. In order to obviate this problem, a locking arrangement, generally indicated by reference numeral 100, is provided which insures that the reflector 16 is spaced from the film container supporting member 28 before the closure means 24 is opened. In other words, the camera cannot be loaded with a new film pack while the camera 10 is in the folded position.

Locking arrangement 100 is mounted within a recessed portion 102 of loading door 24 and is of a thickness substantially equal to or less than the depth of recess 102 in order to preserve the smooth surface of the interior surface of door 24 and to provide an uninterrupted path for the film unit to travel as it passes from the processing rolls 54 to the exterior of the camera. Recess 102 is covered by a thin plate 104 having an opening 106 therein for providing access to the release means 108 of the locking arrangement. Release means 108 includes a knurled portion 110 to facilitate operation thereof and is pivoted at 112 to the interior surface of door 24. An integral arm 113 extends toward a side of the camera and terminates in an upwardly turned end 114 having a recess 116 therein for receiving in locking engagement pin 94, mounted on U-shaped leg 80. On the opposite side of pivot 112 is a portion 118 having a recess 120 therein for pivotally receiving an end 122 of link 124. Link 124, which is pivotally coupled to door 24 at 126, includes a portion 128 extending toward the opposite side of camera 10 and terminating in an upwardly turned end 130 having a recess 132 therein for receiving in locking engagement therewith pin 94 mounted on U-shaped member 82. Link 124 is biased in a counterclockwise direction (as viewed in FIG. 4) by a spring 134 having one end held fast in a recess 136. Movement of link 128 in a counterclockwise direction causes release 108 to rotate in a clockwise manner until it abuts a limit stop 138. Each upwardly turned end 114 and 130 is provided with an inclined surface 135 which is engaged by a pin 94 as the sections are moved to the folded position and moved against the bias of spring 134 until the pin clears the inclined surface and enters the recess 116 or 132, respectively. In this latter position door 24 is locked against movement relative to support member 28.

As can be seen in FIG. 2, when the camera is in the folded position, a portion of section 18 functions as a covering means by covering release means 108 such that the latter is inaccessible to the user of the camera and reflecting surface 16 is positioned closely adjacent and in overlying relation to the film container 53. Should it be desired to reload the camera with a new film pack, the rangefinder-viewfinder 38, which may broadly be considered to be a part of the erecting system of the camera, is moved from the position shown in FIG. 2 toward the position shown in FIG. 1. This latter movement of rangefinder-viewfinder 38 causes erecting links 40 to pivot about pin 90 in a counterclockwise manner. Each link 40 has a pin (not shown) near its upper end (as viewed in FIG. 1) which rides in a groove 32 running along each side of section 14 to transmit motion to the latter for moving the various sections of the camera to the extended or erect position. Detent means (not shown) are provided for releasably maintaining the sections 12, 14, 18 and 20 in the erect position. In the erect position the shutter section 18 has been moved to a position wherein the release means 108 is now accessible to the user of the camera and the reflector 16 is spaced from support member 28. Actuation of release means 108 in the direction of the arrow will release door 24 from locking engagement with support member 28, thereby allowing the old film container to be removed and a new one inserted into engagement with the support member without fear of damaging the reflector 16.

Although one wall, i.e., wall 24, of section 12 has been described as a closure means or loading door, it should be understood that only a portion of wall 24 need be pivoted to the remainder of the wall in order to serve its function as a closure means. Also, it is possible that the sections of the housing could be arranged such that portions of one or more sections could overlie the release means 108 in the camera's folded position.

From the foregoing it can be seen that there has been disclosed a folding camera wherein various components are coupled to a main support member in a simple and effective manner to assist in maintaining the various components in proper spacial relation during their movement between an extended, operative position and a folded position. The support member not only provides a location for centralizing forces acting upon various components of the camera but also functions to properly locate and support a film unit or photosensitive element in position for exposure when the camera is in the extended position.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A compact folding camera comprising, in combination:
   a support member for locating and supporting a photosensitive element in position for exposure;
   a housing encompassing said support member and including at least first and second sections coupled to said support member for movement relative to one another between an extended, operative position and a compact, folded position, said second section including a component of the camera's exposure system for directing light along an optical path toward a photosensitive element located in position for exposure when said sections are in said extended position;
   closure means forming at least a portion of said first section, said closure means being movable between open and closed positions to allow loading of a photosensitive element into position with said support member; and erecting means including at least one link extending between said support member and one of said sections for supporting said sections in said extended position.

2. A compact folding camera comprising, in combination:

a support member for locating and supporting a photosensitive element in position for exposure;

a housing encompassing said support member and including at least first and second sections coupled to said support member for movement relative to one another between an extended, operative position and a compact, folded position, said second section including a component of the camera's exposure system for directing light along an optical path toward a photosensitive element located in position for exposure when said sections are in said extended position;

closure means forming at least a portion of said first section, said closure means being movable between open and closed positions to allow loading of a photosensitive element into position with said support member;

erecting means coupled to said support member for supporting said sections in said extended position; and a third section pivotally coupled to said support member, said third section including a lens for exposing a photosensitive element located in position for exposure when said sections are in said extended position.

3. A compact folding camera as defined in claim 1 wherein said component is a reflector.

4. A compact folding camera as defined in claim 1 wherein said housing includes a third section movably coupled to said support member for movement relative to said first and second sections between said extended and folded positions.

5. A folding camera as defined in claim 4 further including processing means for processing a photosensitive element subsequent to exposure, said processing means being mounted on said closure means.

6. A folding camera as defined in claim 5 wherein said component is a reflector mounted on said second section and said third section includes a lens for directing light toward said reflector.

7. A folding camera as defined in claim 6 wherein said housing includes a fourth section movably coupled to said second and third sections for movement between said extended and folded positions, said fourth section providing a section of a protective cover for said camera in said folded position.

8. A compact folding camera as defined in claim 1 further including bellows mounted on said support member to define in cooperation with said housing, a lighttight exposure chamber.

9. A compact folding camera as defined in claim 1 wherein said support member includes means for guiding withdrawal apparatus mounted within the camera for moving a photosensitive element from said exposure position subsequent to exposure.

10. A compact folding camera as defined in claim 1 wherein said erecting means includes a viewfinder.

* * * * *

UNITED STATES PATENT OFFICE
CERTIFICATE OF CORRECTION

Patent No. 3,640,724          Dated February 8, 1972

Inventor(s) Irving Erlichman

It is certified that error appears in the above-identified patent and that said Letters Patent are hereby corrected as shown below:

In the Claims:

Column 6, after line 27 insert:

--11. A compact folding camera as defined in claim 1 wherein said component is a lens.--.

On the cover sheet, under the Abstract, "10 Claims, 4 Drawing Figures" should read -- 11 Claims, 4 Drawing Figures -- .

Signed and sealed this 27th day of March 1973.

(SEAL)
Attest:

EDWARD M. FLETCHER, JR.         ROBERT GOTTSCHALK
Attesting Officer                Commissioner of Patents